J. M. SIMMS.
MACHINE FOR CONNECTING PIPE SECTIONS.
APPLICATION FILED JAN. 10, 1916.
1,187,665.
Patented June 20, 1916.
2 SHEETS—SHEET 1.
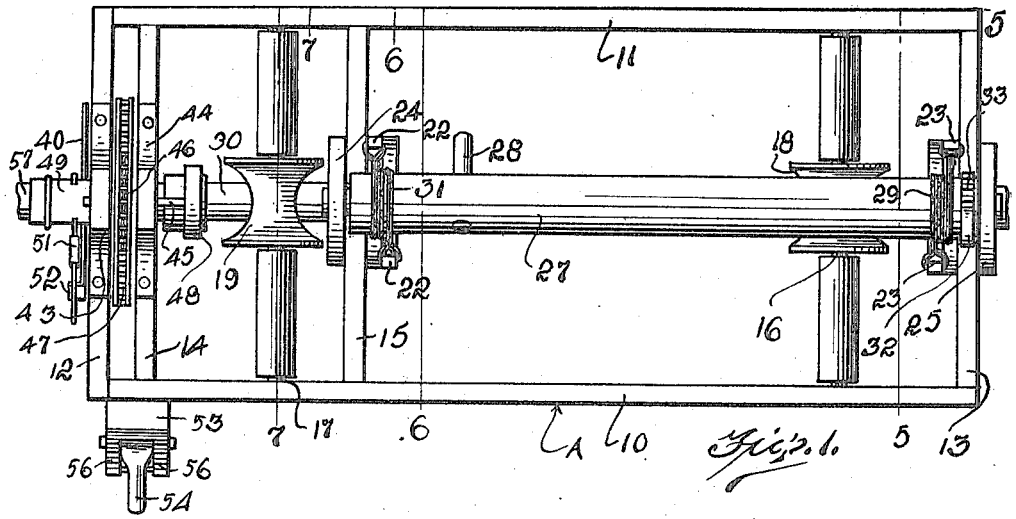
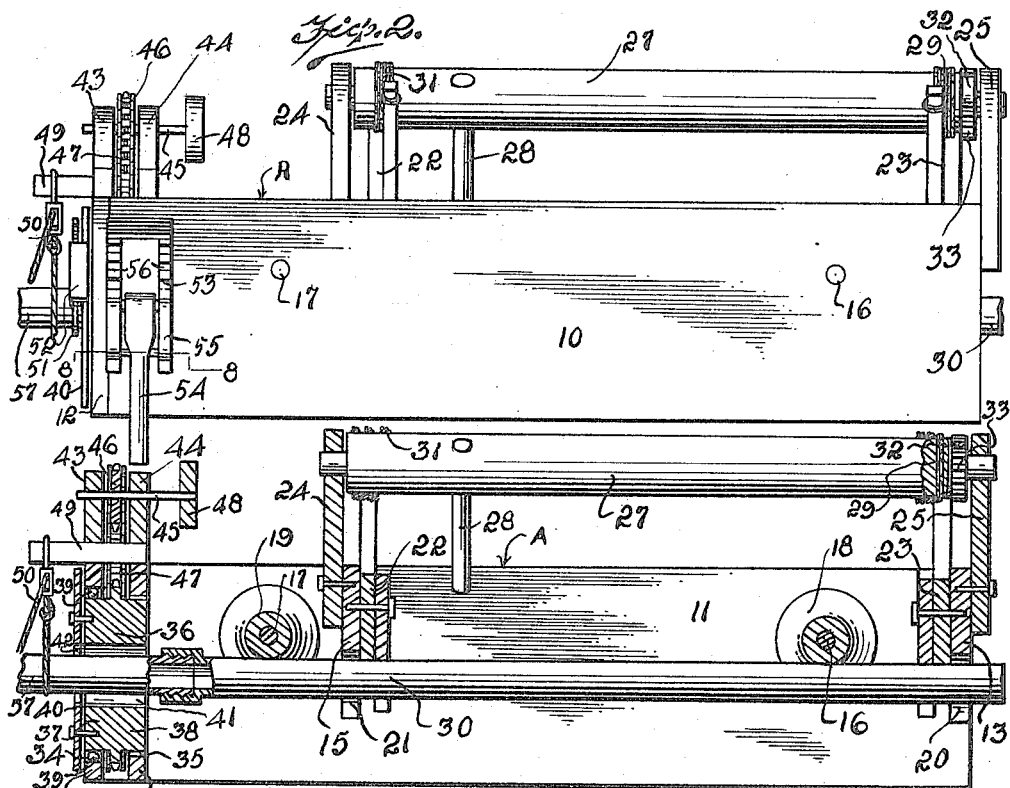
Witnesses
R. K. Stevens
Harry T. Bright
Inventor
J. M. Simms.
By Chandler & Chandler
Attorneys J. M. SIMMS.
MACHINE FOR CONNECTING PIPE SECTIONS.
APPLICATION FILED JAN. 10, 1916.
1,187,665.
Patented June 20, 1916.
2 SHEETS—SHEET 2.
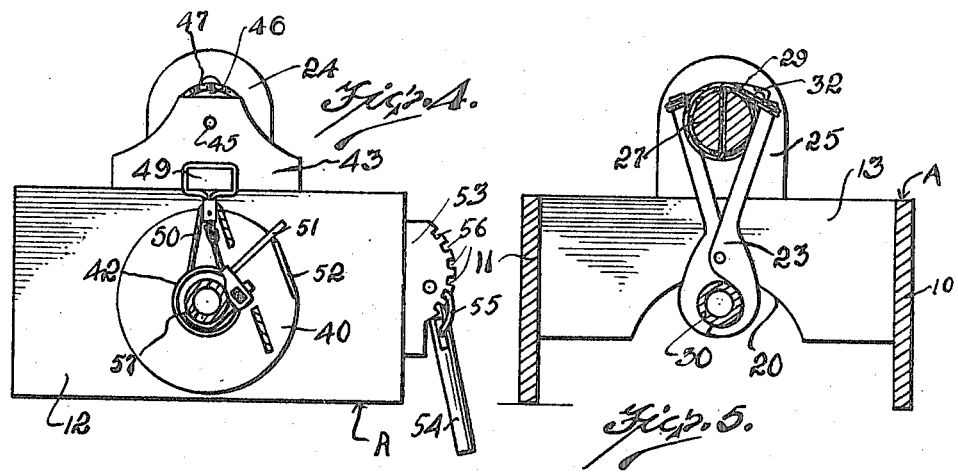
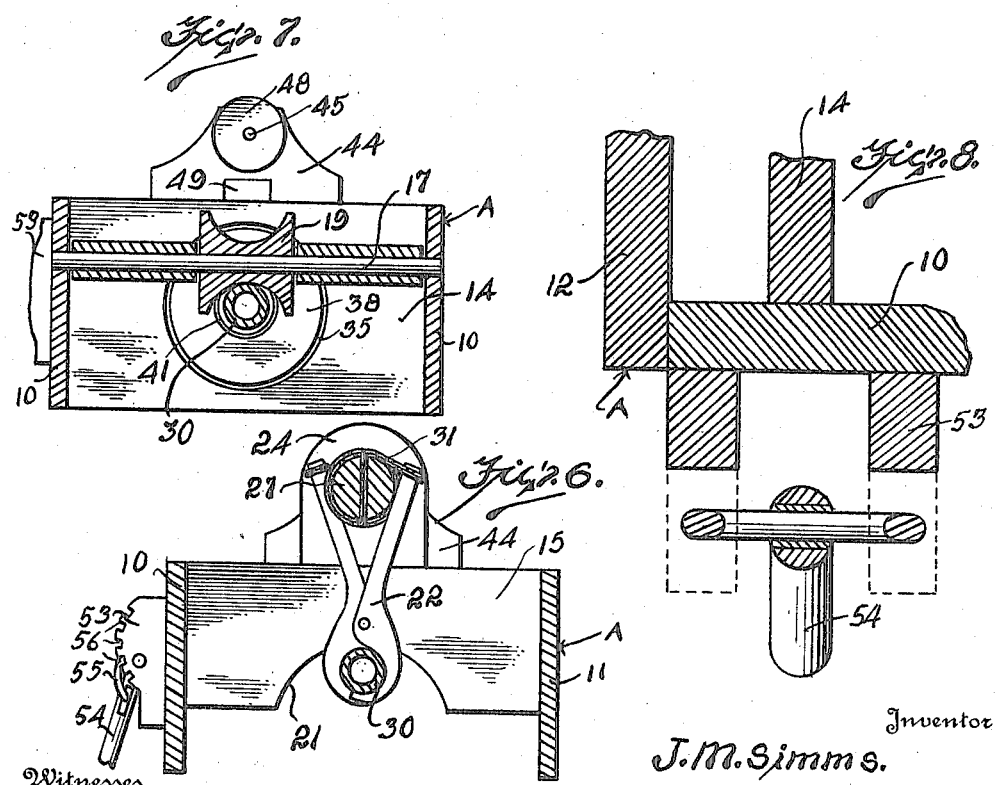

UNITED STATES PATENT OFFICE.

JOE M. SIMMS, OF COMO, TEXAS.

MACHINE FOR CONNECTING PIPE-SECTIONS.

1,187,665. Specification of Letters Patent. Patented June 20, 1916.

Application filed January 10, 1916. Serial No. 71,334.

*To all whom it may concern:*

Be it known that I, JOE M. SIMMS, a citizen of the United States, residing at Como, in the county of Hopkins, State of Texas, have invented certain new and useful Improvements in Machines for Connecting Pipe-Sections; and I do hereby declare the following to be a full, clear, and exact description of the invention, such as will enable others skilled in the art to which it appertains to make and use the same.

This invention relates to machines for connecting the threaded ends of pipe sections.

The object of the invention is to provide a machine of the character named embodying an improved construction whereby the ends of relatively heavy and large pipe sections may be screwed together with facility and with a minimum amount of manual labor, the machine being particularly adapted for use in connecting up the sections of an oil pipe line leading from the oil fields to the refinery.

A further object of the invention is to provide a machine of the character named which will be efficient in operation, easily controlled, and simple in construction.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of the machine; Fig. 2, a side elevation thereof; Fig. 3, a vertical longitudinal section; Fig. 4, a front view; Fig. 5, a section on the line 5—5 of Fig. 1; Fig. 6, a section on the line 6—6 of Fig. 1; Fig. 7, a section on the line 7—7 of Fig. 1, and Fig. 8, a section on the line 8—8 of Fig. 2.

Referring to the drawing the improved pipe handling machine is shown as comprising a frame A which includes side members 10 and 11, a front member 12, and a rear member 13. The side members 10 and 11 are connected by cross members 14 and 15 the former being disposed relatively near the front member 12. Mounted in the side members 10 and 11 adjacent the rear member 13 is a cross shaft 18, while a corresponding cross shaft 17 is mounted in the side members 10 and 11 between the cross members 14 and 15. Rotatably mounted on the shafts 16 and 17 respectively are grooved rollers 18 and 19. The rear member 13 and the cross member 15 are provided with recesses 20 and 21 respectively the innermost portions of the walls of which are disposed above the bottoms of the grooves of the rollers 18 and 19 so that said rollers can engage the portion of a pipe line already set up as clearly shown in Fig. 3 and thereby afford an efficient means for permitting the device to be moved along the pipe line and for supporting the device during its operation. During the operation of the device it is adapted to be clamped to the portion of the pipe line already set up and to this end there is pivotally mounted on the cross member 15 and the rear member 13 respectively pairs of tongs 22 and 23 the jaws of which are positioned so as to be brought into clamping engagement with the pipe upon which the rollers 18 and 19 rest. Mounted on the cross member 15 and the rear member 13 are upwardly extending journal brackets 24 and 25 respectively. Rotatably mounted in these brackets is a shaft 27 having fixed thereto an operating handle 28. The handles of the tongs 23 are connected by a flexible cable 29, which cable is passed through the shaft 27 and suitably secured to the latter so that by rotating the shaft 27 in one direction through the medium of the handle 28 the handles of the tongs 23 will be moved toward each other and the jaws of said tongs brought into clamping relation with the pipe, indicated at 30. Likewise the handles of the tongs 22 are connected by a flexible cable 31 and this cable is passed through an opening in the shaft 27 and made fast to the latter so that the rotative movement of the shaft 27 which operates the tongs 23 into clamping relation with the pipe 30 will also operate the tongs 22 into clamping relation with said pipe. In order to lock the shaft 27 against rotation when the tongs 22 and 23 are in clamping position there is pivotally mounted on the bracket 25 a pawl 32 which coöperates with teeth 33 on the shaft 27.

The front member 12 and cross member 14 are provided with alined openings 34 and 35 respectively. Disposed between the front member 12 and cross member 14 is a sprocket wheel 36 having hub portions 37 and 38 extending into the openings 34 and 35 respectively. Interposed between the hub portion 37 and the wall of the opening 34 is a plurality of ball bearings 39 which are held in place by means of a metal disk 40 secured to the outer end of the hub portion 37. The sprocket wheel 36 is provided with a central passage 41 of a diameter sufficient for the proper functioning of the machine when a pipe section is inserted therethrough and the machine operated to screw said section on to another section. The disk 40 is also provided with an opening 42 which alines with the passage 41. Mounted on the upper edges of the front member 12 and the cross member 14 are brackets 43 and 44 in which is rotatably mounted a shaft 45 having fixed thereon between said brackets a sprocket wheel 46 and traveling on this sprocket wheel and the sprocket wheel 36 is a sprocket chain 47. Also fixed on the shaft 45 is a belt wheel 48 whereby said shaft may be connected with a suitable source of power to effect rotation thereof and thereby operate the machine. Secured to the upper edges of the members 12 and 14 and projecting forwardly of the machine is a beam 49 which carries a hoist 50 for supporting a pipe section during the operation of the machine. Pivotally mounted on the disk 40 is a "Stilson" wrench 51 the handle of which is adapted to engage a flange 52 on the disk 40 for the purpose of limiting pivotal movement thereof in one direction. Secured to the side member 10 at the forward end thereof is a bracket 53 to which is pivoted a prop 54 carrying a pawl 55 adapted to selectively engage teeth 56 formed on the bracket 53 and whereby said prop may be locked in a desired adjustment. This prop is adapted to engage the ground during operation of the machine to prevent same from pivoting laterally as will be obvious.

In the operation of the machine the pipe section to be applied, said section being indicated at 57 is inserted through the opening 42 and passage 41 and supported by the hoist 50. The pipe section 57 is then started on the section 30 and the wrench 51 applied around the section 57. The rotation of the shaft 45 is then instituted and the application of the pipe section 57 to the section 30 completed mechanically as will be obvious. The wrench 51 is then disengaged from the pipe section 57, the tongs 22 and 23 released, and the machine moved along on the section 57 and again clamped in position when it is ready for the application of another pipe section 57.

What is claimed is:—

1. In a machine of the class described, the combination of a frame, means for clamping the frame to a pipe section, spaced members included in said frame and having alined openings therein, a tubular member rotatably mounted in said openings, sprocket teeth on said member between the spaced members of the frame, a shaft rotatably mounted in the spaced members of the frame, a sprocket wheel fixed on said shaft between the spaced members of the frame, a sprocket chain traveling on said sprocket wheel and operatively engaged with the sprocket teeth on the tubular member, and a pipe wrench secured to said tubular member.

2. In a machine of the class described, the combination of a frame, spaced pairs of clamping tongs mounted on said frame, a rotatable member mounted on the frame, connections between said member and the elements of the tongs whereby the rotation of the member will clamp the tongs on a pipe to secure the frame thereto, means for rotating the member, a second rotatable member carried by the frame and adapted to be non-rotatably secured to a pipe section, and means for rotating the second member.

In testimony whereof, I affix my signature, in the presence of two witnesses.

JOE M. SIMMS.

Witnesses:
B. T. WILLIAMS,
G. M. HOER.

Copies of this patent may be obtained for five cents each, by addressing the "Commissioner of Patents, Washington, D. C."